(12) United States Patent
Selkirk

(10) Patent No.: US 7,634,506 B2
(45) Date of Patent: Dec. 15, 2009

(54) CLIENT-SIDE SAMPLING OF REPORTABLE EVENT INFORMATION

(75) Inventor: Alexander G Selkirk, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 11/128,089

(22) Filed: May 11, 2005

(65) Prior Publication Data

US 2006/0271592 A1   Nov. 30, 2006

(51) Int. Cl.
*G06F 7/00* (2006.01)
*G06F 12/00* (2006.01)
*G06F 17/00* (2006.01)
*G06F 17/30* (2006.01)

(52) U.S. Cl. .................................. 707/200; 707/104.1
(58) Field of Classification Search ....................... None
See application file for complete search history.

(56) References Cited

U.S. PATENT DOCUMENTS

| | | | | |
|---|---|---|---|---|
| 5,023,805 A | * | 6/1991 | Aune et al. | 702/38 |
| 5,276,679 A | * | 1/1994 | McKay et al. | 370/358 |
| 5,528,516 A | * | 6/1996 | Yemini et al. | 702/181 |
| 5,765,158 A | * | 6/1998 | Burrows | 707/101 |
| 5,809,235 A | * | 9/1998 | Sharma et al. | 709/230 |
| 5,857,190 A | * | 1/1999 | Brown | 707/10 |
| 5,974,567 A | * | 10/1999 | Dickson et al. | 714/27 |
| 6,119,103 A | * | 9/2000 | Basch et al. | 705/35 |
| 6,314,533 B1 | * | 11/2001 | Novik et al. | 714/39 |
| 7,334,005 B2 | * | 2/2008 | Sobel | 707/203 |

* cited by examiner

*Primary Examiner*—Neveen Abel Jalil
*Assistant Examiner*—Michael J Hicks
(74) *Attorney, Agent, or Firm*—Workman Nydegger

(57) ABSTRACT

A networked computing system for reporting software events occurring on a client computer to a collection service is presented. The networked computing system comprises a collection service, communicatively coupled to a communications network, and a plurality of client computers. The collection service is configured to receive software events from a client computer over the communications network. Each client computer is also communicatively coupled to the communications network. Each client computer is further configured to generate a sampling value on the client computer for a corresponding software module, and detect the occurrence of a software event corresponding to the software module. Upon detecting the occurrence of a software event corresponding to the software module, each client computer determines whether a sampling value falls within a predetermined sampling range, and if so, reports the software event to the collection service over the communications network.

16 Claims, 6 Drawing Sheets

CLIENT-SIDE SAMPLING OF REPORTABLE EVENT INFORMATION

FIELD OF THE INVENTION

The present invention relates to a computer implemented system for providing efficient data sampling, and more particularly, a computer implemented system providing client-side data sampling of reportable events.

BACKGROUND OF THE INVENTION

Nearly all software providers distribute, in some form or fashion, software updates for the software products and services they have sold to their clients. Prior to the prominence of the Internet, software providers distributed software updates on some form of computer-readable media, such as a floppy disk, a magnetic tape, or an optical disk. Moreover, in pre-Internet times, software providers offered software updates on an infrequent basis, such as on an annual or semi-annual basis. Now, however, with the ubiquitous prominence of the Internet, nearly all software providers distribute software updates in an online manner, where a client simply downloads an available software update to the client computer over the Internet. Furthermore, software updates are now available much more frequently, such as on a weekly, bi-weekly, or monthly basis.

While software providers take various quality control measures, sometimes extensive measures, to ensure that their software updates download and install on a client device in a problem-free manner, they also realize that there may be cases where there are problems with a software update, such as failure to download to a client computer, and failure to install, as well as more worrisome problems such as failure to operate the updated software application, or another application, after the software update has been installed. Thus, for a variety of reasons, including ensuring the quality of the distribution and installation of software updates, as well as simply collecting data to provide accurate statistics as to the reach of an update and forecasting growth areas, software providers frequently monitor or gather information regarding the distribution, downloading, and installation of software updates.

FIG. 1 is a pictorial diagram illustrating a typical event collection system 100 for collecting software update distribution and installation information from client systems, as found in the prior art. Typically after each phase of software update distribution, including determining whether an update is available, downloading an update from a distribution location, and installing the update on the client computer, client computers report update event information to the software provider detailing the success or failure of each phase.

As shown in FIG. 1, client computers 102-110 send update event information through a communication network, such as the Internet 112, to a collection service 114 provided by or associated with a software provider. Upon receiving update event information, the collection service 114 will typically store the update event information (at least temporarily) in update event store 116. As indicated above, the update event information will typically include some indication as to the success or failure of the particular reported event (download, install, execution, etc.). Furthermore, update event information may include a success indicator that supports a range of values corresponding to the event, including success, failure, client cancellation, success upon reboot of the client computer, and the like.

Clearly, one of the problems (at least to this point) of collecting software update event information is the large amount of information that must be collected, organized, and evaluated. As mentioned above, for each update, numerous update events may be transmitted to the collection service 114. For software providers having a large client base and/or numerous products, this problem can be especially acute. For example, Microsoft Corporation's family of Windows® operating systems boasts a customer base of nearly 200 million installations. Assuming that a software update is released that addresses a critical security issue, such as a weakness exploited by a computer virus circulating and infecting computers worldwide, nearly all of the installed base will want to download and install the software update as quickly as possible. Further assuming that at least two update events (which is very conservative) will be sent by each client computer to the collection service 114, one after downloading the update and one after its installation, 400 million events will be sent to the collection service in regard to that one software update! This number of events, of itself, can overwhelm many computer systems. Of course, as those skilled in the art will appreciate, any given software update may include a prerequisite that one or more other software updates must be previously or concurrently installed. Moreover, each prerequisite update will also generate at least two software update events. Considering that updates are frequently released on a periodic basis, sometimes as many as ten updates per month, it is easy to see how the 400 million events can easily grow into well over a billion events (10 updates times 2 update events times 200 million installations), and how these update events are concentrated into a very small timeframe.

In addition to planning for and accommodating very large numbers of update events over the Internet 112, a software provider must also have some plan for processing the reported information into useable data. When such large numbers of update events are reported, processing each and every event is almost always impractical. As such, software providers usually rely upon a statistical sampling of the reported events, one that yields accurate results on a relatively small sample of the entire event population. Thus, as shown in FIG. 1, the collection service 114 selects an update event sample 118 from the update event store 116 (based on selection principles that support statistical sampling), and uses that sample to generate an update event report 120 for the software provider to ensure quality control, determine the reach of any software update, predict growth areas, and the like.

Clearly, receiving update events from each client computer for each software update, while viewed as necessary by many software providers, also poses numerous and significant challenges, including handling the potential network traffic, temporarily storing the received events, and processing the received events into meaningful data. In light of these issues, what is needed is an efficient network collection system for sampling information prior to submitting it to a collection service, i.e., client-side event sampling. The present invention addresses these and other issues found in the prior art.

SUMMARY OF THE INVENTION

According to aspects of the present invention, a networked computing system for reporting software events occurring on a client computer to a collection service is presented. The networked computing system comprises a collection service communicatively coupled to a communications network and a plurality of client computers. The collection service is configured to receive software events from a client computer over the communications network. Each client computer is also communicatively coupled to the communications network. Each client computer is further configured to generate a sampling value on the client computer for a corresponding software module, and detect the occurrence of a software event corresponding to the software module. Upon detecting the occurrence of a software event corresponding to the software module, each client computer determines whether the sampling value falls within a predetermined sampling range, and if so, reports the software event to the collection service over the communications network.

According to additional aspects of the present invention, a computer-readable medium bearing computer-executable instructions is provided which, when executed on a client computer, carries out a method for reporting software events to a collection service. The method comprises the following: a sampling value is generated. A reportable software event is detected on the client computer. A determination is made as to whether the software event should be reported to the collection service according to the sampling value. If it is determined that the software event should be reported according to the sampling value, the software event is reported to the collection service.

According to yet further aspects of the present invention, a method for reporting software events on a client computer to a collection service is presented. A sampling value corresponding to a software module is generated and stored in a persistent storage on the client computer. A predetermined sampling range is obtained. The occurrence of a reportable software event corresponding to the software module is monitored for on the client computer. For each reportable software event detected on the client computer, a determination is made as to whether the reportable software event should be reported to the collection service by determining whether the generated sampling value falls within the predetermined sampling range. The reportable software event is reported to the collection service if the reportable software event should be reported according to the sampling value.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

With regard to the following discussion, the focus of the discussion will relate to the reporting and gathering of events (update events) associated with the distribution and installation of software updates on a client system. However, it should be appreciated that the principles discussed herein, particularly client-side sampling of reportable information, i.e., information requested by a software provider from client computers, may be applied to any number of situations not related to the distribution of software updates. In fact, the present invention may be applied to numerous data collection systems where client computers report "event" information to a software provider which, in turn, uses a sampling of the reported event information for various purposes.

According to aspects of the present invention, each client computer is configured to perform client-side update event sampling. Client-side update event sampling means that each client computer that may report update events determines for itself, according to predetermined criteria, whether to actually report any update events that occur on the client computer. Stated another way, when a reportable update event occurs on the client computer, the client computer uses certain criteria to determine whether the update event should be a part of the sample that the software provider requests, and reports the update event if the update event is to be included in the software provider's sample of update events.

Figure 1:
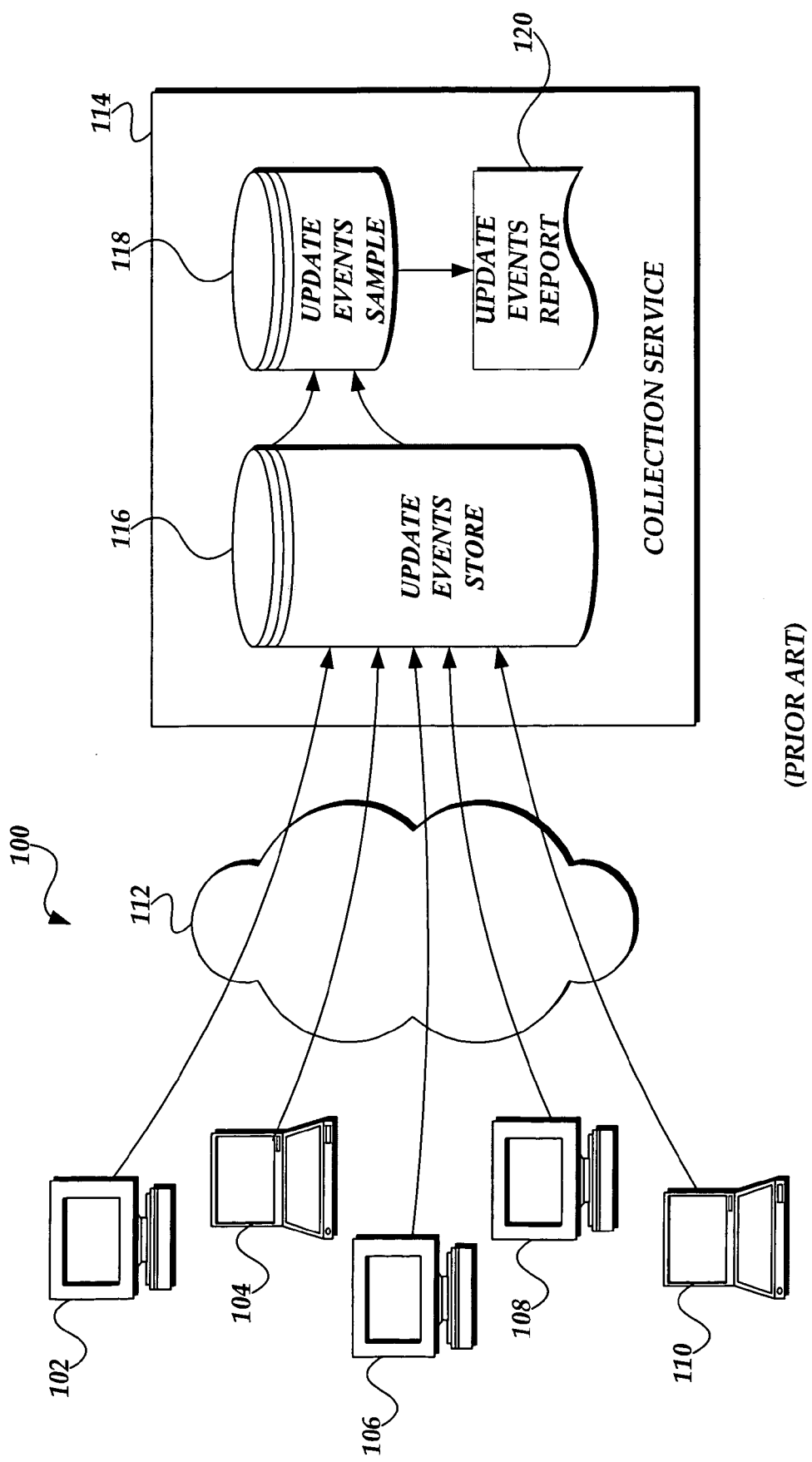
FIG. 1 is a pictorial diagram illustrating a typical event collection system for collecting software update distribution and installation information from client systems, as found in the prior art.
Figure 2:
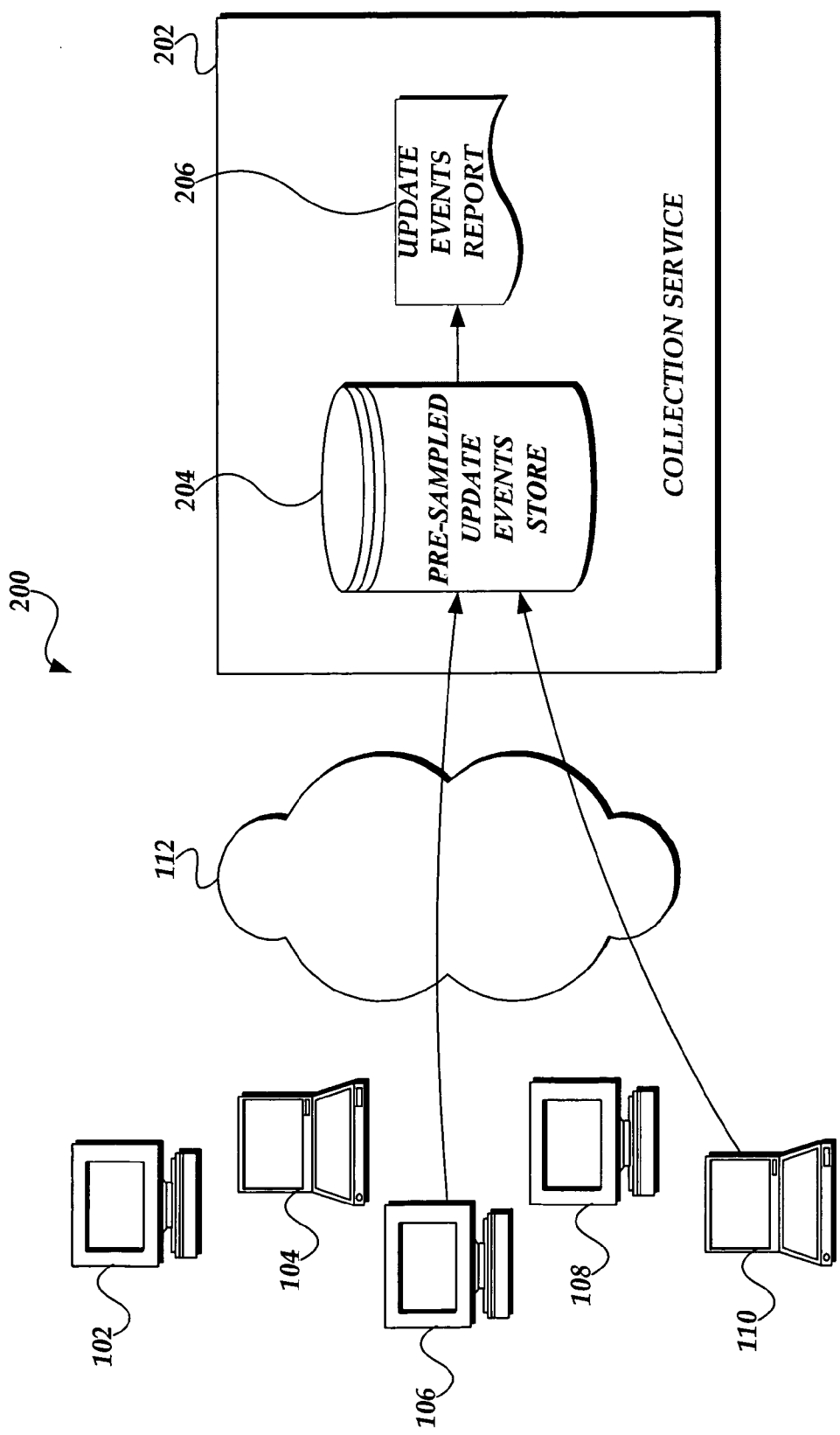
FIG. 2 is a pictorial diagram illustrating an event collection system, with client computers implementing client-side update event sampling, for collecting software update distribution and installation information from client computers.

FIG. 2 is a pictorial diagram illustrating an event collection system 200, with client computers implementing client-side update event sampling, for collecting software update distribution and installation information from client computers. As with FIG. 1, the exemplary collection system 200 includes client computers 102-110, each of which may generate update events through activities such as downloading and installing software updates. However, in contrast to FIG. 1, due to client-side sampling, only client computers 106 and 110 report generated update events to the collection service 202.

For its part, the collection service 202 stores all of the reported update events in the pre-sampled update events store 204. These pre-sampled update events are then used to generate the update event report 206. By implementing client-side sampling, only those update events that will be used by the software provider (or collection service 202) in generating the update event report 206 are transmitted over the Internet 112. Depending on the size of the sample, this reduction may represent a substantial savings in terms of necessary network bandwidth, and the collection service 202 infrastructure necessary to receive and process the reported update events, while still maintaining a high degree of accuracy. For example, various projections estimate that the reported update event volume may be reduced by 75% with little or no loss of accuracy (±0.03%).

According to the present invention, each client computer generates sample criteria that the client computer subsequently uses to determine whether to report an update event or not. The client computer typically generates the sample criteria on a per software application basis. In other words, the client computer may be part of the sample reported to the collection service 202 for a first application, and may not be part of the sample reported to the collection service 202 (if they are the same) for a second application. Typically, in order to ensure the integrity of the statistical foundation of the samples, the sample criteria are the product of random generation.

According to an actual embodiment of the present invention, for a given software application, the client computer generates a random sampling value in the range of 1 and 100. The software provider provides a sampling range to the client computer indicating the range of sampling values that are to be included in the update event sample. In one embodiment, only one number is provided as a sampling range, indicating that sampling values less than or equal to the provided number fall within the sampling range. Those client computers whose sampling value falls in the sampling range are to be included in the update event sample.

While determining whether a client computer is to be included in an update event sample is based on whether a predetermined random number falls within a sampling range has been described, it should be viewed as only one way for a client computer to determine whether the client computers' update events are to be included in the update event sample. Those skilled in the art will appreciate that there are numerous means for determining whether a client computer is to be included in an update event sample, all of which fall within the scope of the present invention. Accordingly, the above described embodiments should be viewed as illustrative only, and not construed as limiting upon the present invention.

According to aspects of the present invention, the client computer generates and stores the predetermined sample criteria (such as a sampling value) for a software application, and continually uses the predetermined sample criteria until some occasion arises that indicates that the sample criteria no longer applies, or should be regenerated. For example, the predetermined sample criteria may be continually used by the software application until a new version of the software application is installed, upon substantial modification to the client computer, at the direction of the software provider (such as in a software update), or the like. Of course, the software provider could similarly modify the sampling range as well, such as by sending a notice to the software application/client computer, or in a software update.

The client computer typically initially generates the sampling value during installation of the corresponding software application. However, the present invention is not so limited. Alternatively, the client computer may generate the sampling value during a software update, or at some other time upon notification from the software provider. Upon generating the sampling value, the client computer stores the sampling value for this application in a persistent storage area, such as the system registry. If necessary, sampling range values may also be stored on the client computer typically, though not necessarily, with the sampling value.

One advantage realized by storing the sampling values, and sampling ranges, on the client computer is that for a given client computer there is consistent and predictable update event reporting.

Logic and or directions may be provided by the software provider to the client computer to assist in generating a sampling value for a software application. Such logic and/or directions might cause the client computer to consider various data regarding the client computer in generating the sampling value, including, but not limited to, information regarding the client computer's hardware configuration, other software applications installed on the client computer, and the like. Additionally, certain identifiable characteristics, such as whether the client computer is a beta-tester or a study control group, may influence the generation of the sampling value. In this manner, a software provider can exercise fine control over the selection of client computers to be included in an update event sample.

Figure 3:
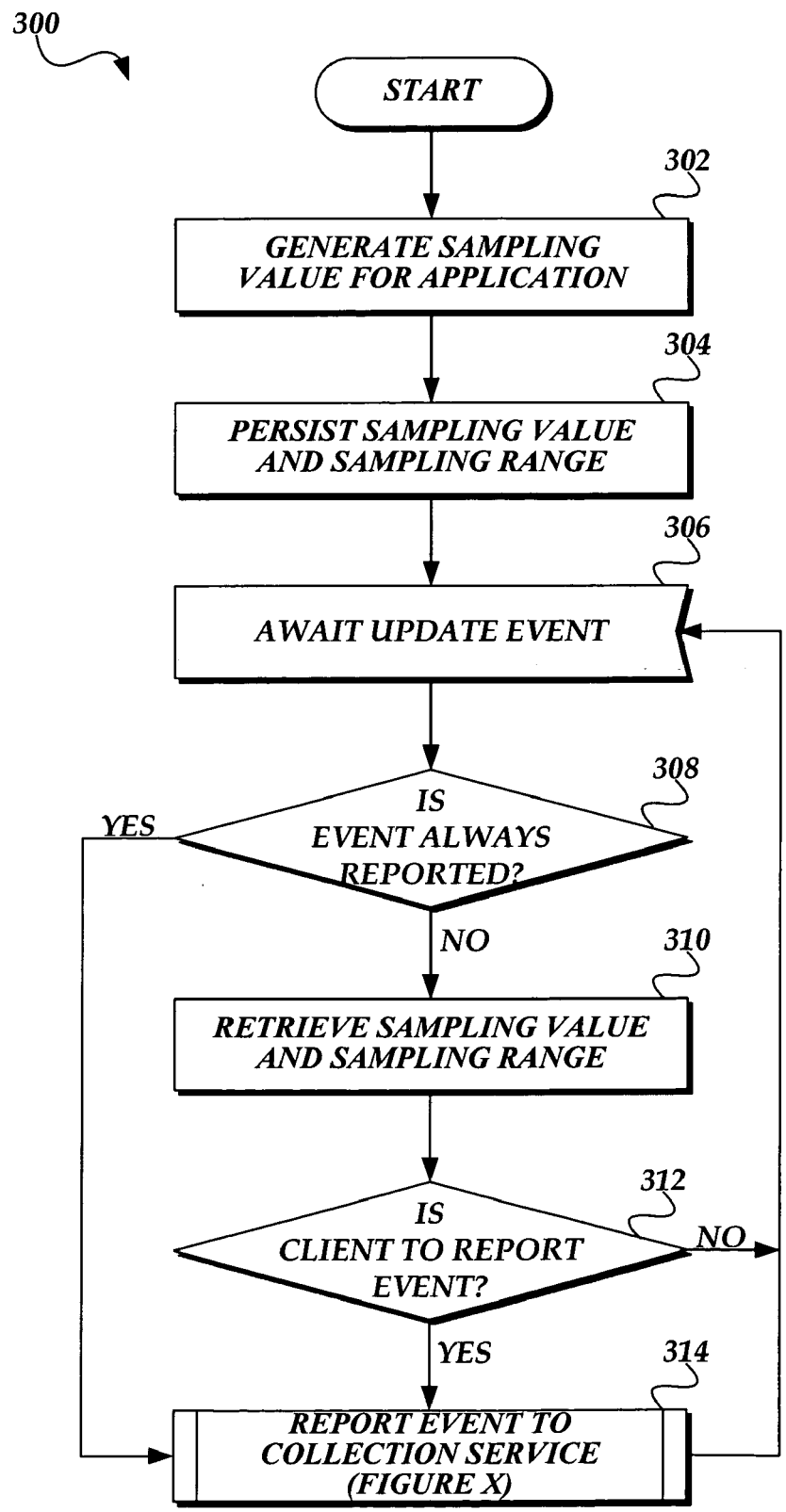
FIG. 3 is a flow diagram illustrating an exemplary routine, implementable on a client computer, for determining whether update events generated by the client computer will be transmitted to a collection service.

FIG. 3 is a flow diagram illustrating an exemplary routine 300, implementable on a client computer, for determining whether update events generated on the client computer will be transmitted to the collection service 202. Beginning at block 302, a sampling value for the software application is generated. At block 304, the sampling value is stored in a persistent storage location on the client computer, typically along with the sampling range from the software provider. As already mentioned, according to one embodiment of the present invention, the sampling value is stored in the system registry, in an area associated with the software application.

At block 306, the exemplary routine 300 waits for an update event to occur on the client computer. Those skilled in the art will appreciate that waiting for an update event to occur is a function typically performed asynchronously with the general operation of the software application. Once a reportable update event, i.e., a condition for which the software provider has requested a sampling, has occurred, at decision block 308, a determination is made as to whether the update event is always reported.

According to one embodiment of the present invention, a software provider may indicate that some update events should always be reported, i.e., the reported sample should be 100% of the reportable update events. For example, it may be very desirable for a software provider to always know, for whatever reason, whether a software update failed to install on a client computer, or whether the software update caused a data corruption to occur on a client computer. Thus, at decision block 308, if the update event is always reported, the routine 300 proceeds to block 314 where the update event is reported to the collection service 202.

If the update event is not always reported, the sampling value and, if stored on the client computer, the sampling range for the software application are retrieved. At decision block 312, a determination is made as to whether the client computer is to report the update event, i.e., whether the client computer is included in the sample for this update event. This is done by determining whether the sampling value falls within the sampling range. If the client computer is to report the update event, at block 314 the update event is reported to the collection service 202. Thereafter, or if the client computer is not to report the update event, the routine 300 returns again to block 306 to await further update events to occur.

Figure 4:
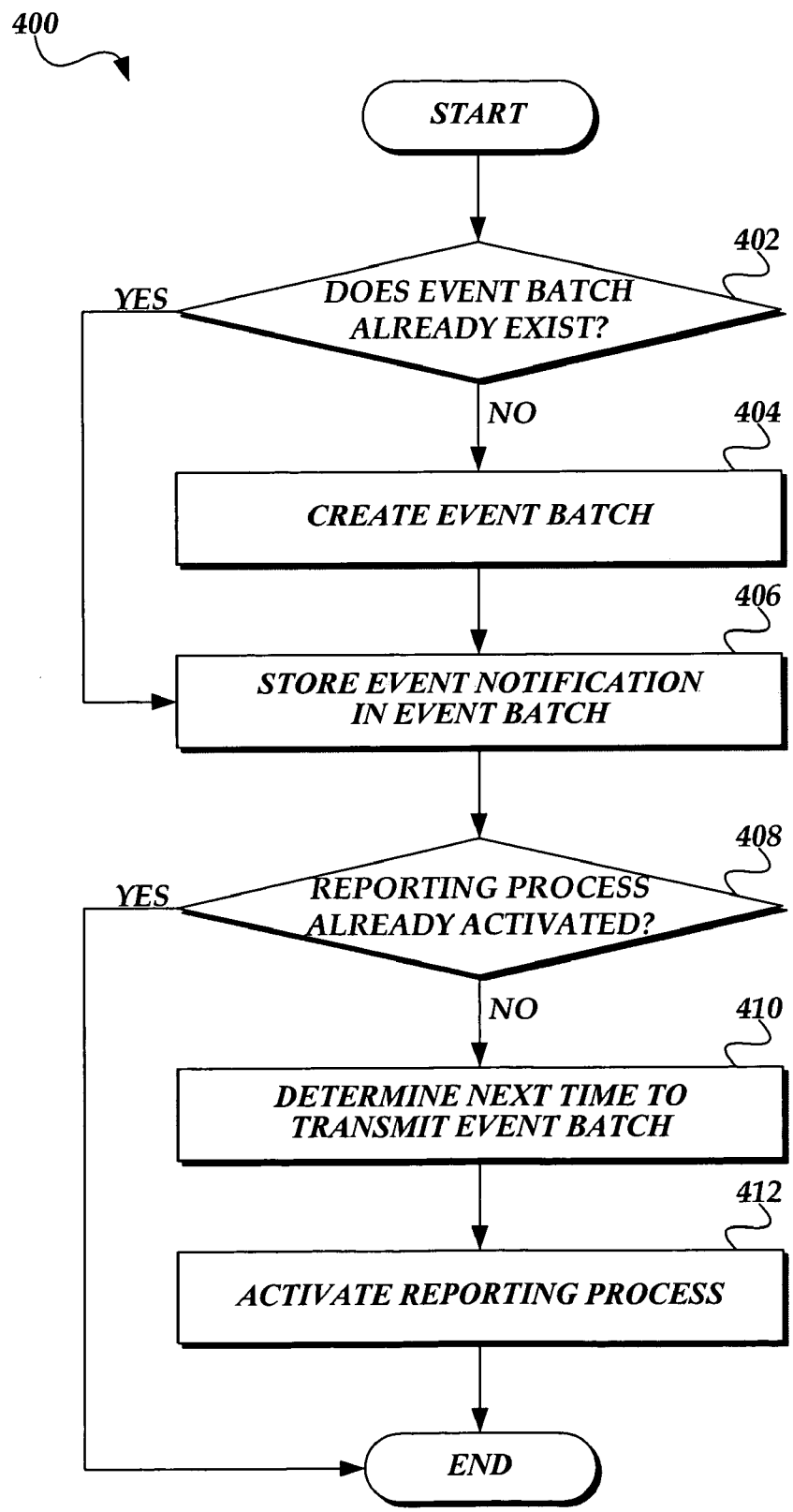
FIG. 4 is a flow diagram illustrating an exemplary subroutine suitable for use by the routine of FIG. 3, for reporting an update event to a collection service, according to aspects of the present invention.

In regard to reporting update events to a collection service 202, FIG. 4 is a flow diagram illustrating an exemplary routine 400 suitable for use by the routine 300 of FIG. 3, for reporting an update event to a collection service, according to aspects of the present invention.

As those skilled in the art will appreciate, update events are frequently reported to a collection service 202 from numerous client computers in small time-frames. More particularly, client computers within a geographic region tend to report update events during similar time-frames, such as during evening hours. This creates spikes in Internet traffic which require substantial infrastructure to handle, yet that same infrastructure is likely to remain idle during off-peak times. Thus, according to aspects of the present invention, in order to more evenly distribute update event reporting during a given time period, a reporting routine 400 generates a reporting time, which may include both a time of day and/or a day of the week, for reporting update events to a collection service 202. This generated reporting time will also typically be stored with the sampling value and sampling range in the persistent store.

With reference to FIG. 4, beginning at decision block 402, a determination is made as to whether an event batch, i.e., a temporary storage for update events, already exists. If the event batch does not already exist, at block 404, an event batch is created. As indicated above, the event batch temporarily stores update events until they are reported to the collection service 202. After creating the event batch at block 404, or if the event batch already exists, at block 406 the update event that is to be sent to the collection service 202 is stored in an event batch.

At decision block 408, a determination is made as to whether an update event reporting process has already been initialized. As will be appreciated by those skilled in the art, an update event reporting process is a process that remains dormant until an appointed time, in this case the determined reporting time. At that appointed time, the update event reporting process awakens and begins to execute by reporting the update events to the collection service. Thus, if the update event reporting process is not already initialized, at block 410, the routine 400 determines the next appointed time to report update events to the collection service according to the generated reporting time. At block 412, the update event reporting process is initialized to awaken at the next appointed time and transmit the update events in the event batch to the collection service 202. Thereafter, the routine 400 terminates.

Figure 5:
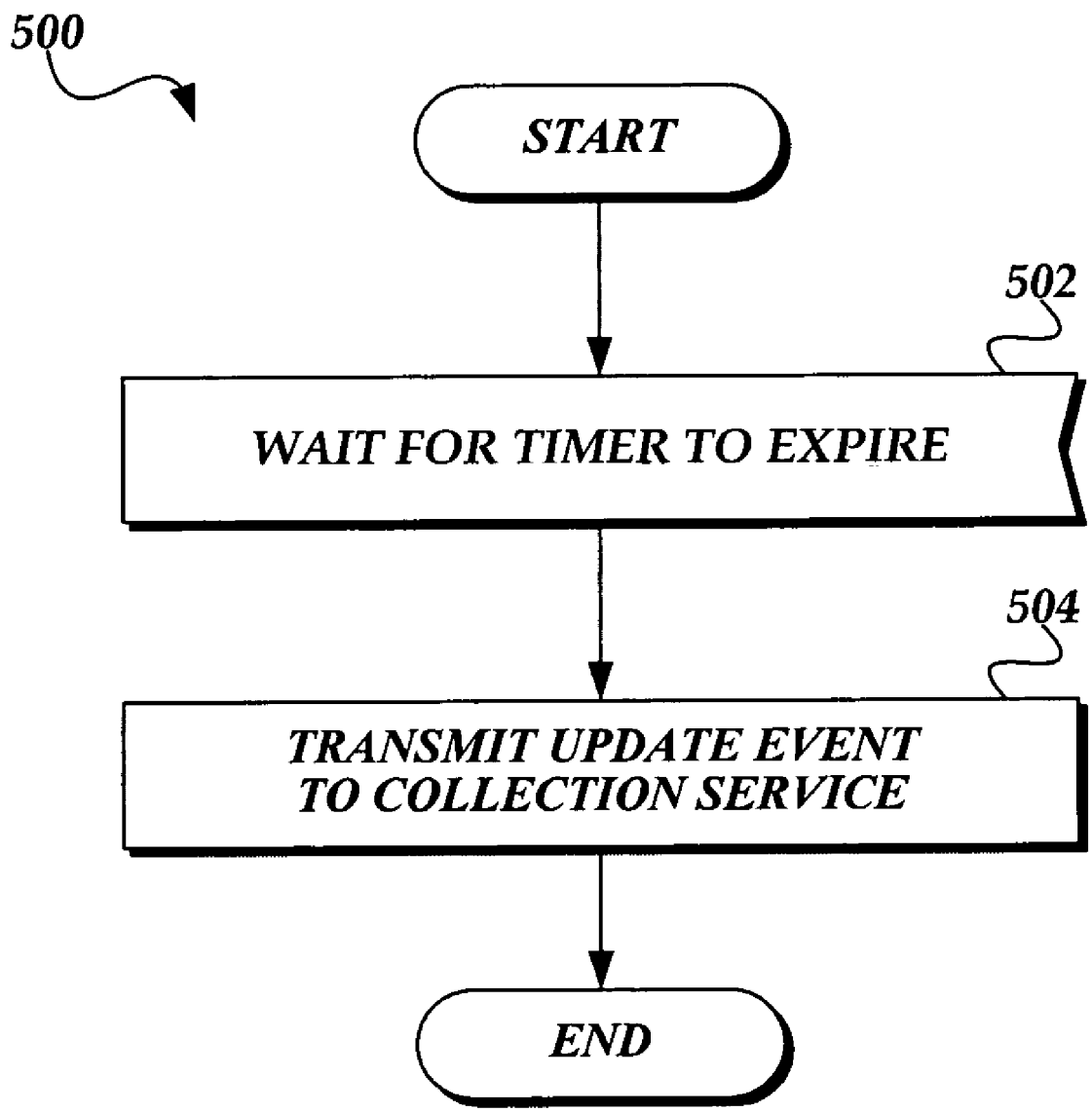
FIG. 5 is a flow diagram illustrating an exemplary update event reporting process for transmitting update events in an event batch to a collection service.

FIG. 5 is a flow diagram illustrating an exemplary update event reporting process 500 for use by the exemplary routine 400. Beginning at waiting block 502, the update event reporting process 500 waits until the appointed time (as described above in regard to FIG. 4.) At block 504, the update events in the event batch are transmitted to the collection service 202. Typically, all update events are transmitted as a single block of data to reduce the number of network connection requests. However, the present invention is not limited to transmitting the event batch as a single block of data. After transmitting the event batch to the collection service 202, the update event reporting process 500 terminates.

Frequently, a software provider may desire different types of update events to be sampled at different rates. For example, a software provider may want a very small sample of client computers reporting that the client computers have checked for updates from an update service, but want a very large sample of client computers reporting that a software update has been downloaded. Still further, for any given type of update event, a software provider may vary the size of the reporting sample based on the status of the update event. For instance, the software provider may want a small sampling of client computers reporting the absolute success of a software update installation, a larger sampling of client computers reporting the success of a software update installation requiring a reboot of the client computer, and all update events reported if the software update installation failed.

According to aspects of the present invention, rather than basing reporting decisions on a single sampling value/range pair, as well as reporting all update events that are failures, a software application may be directed to generate a plurality of sampling values that correspond to a similar plurality of sampling ranges from a software provider. For example, the following table, Table A, represents an exemplary set of sampling ranges provided by a software provider, and for each sampling range, a corresponding sampling value is to be generated (unless, of course, the sampling rate is 100%, which would not require a sampling value to be generated). It should be noted that the following table uses the single value sampling range, meaning that sampling values less than or equal to the sampling range are to be included in the sample. However, it should be further noted that this is illustrative only, and should not be construed as limiting upon the present invention. In an alternative embodiment, a sampling range would include two values which specify upper and lower boundaries for sampling values to be included in the sample.

| UPDATE EVENT TYPE | UPDATE EVENT STATUS | SAMPLING RANGE |
|---|---|---|
| Update Detection Event | UpdateEvent_Success | 0 |
| | UpdateEvent_Failure | 20 |
| Update Software Download Event | UpdateEvent_Success | 20 |
| | UpdateEvent_Failure | 75 |
| | UpdateEvent_UserDeclined | 0 |
| Update Software Installation Event | UpdateEvent_Success | 20 |
| | UpdateEvent_SuccessOnReboot | 20 |
| | UpdateEvent_Failure | 75 |
| | UpdateEvent_Terminated | 75 |
| | UpdateEvent_Canceled | 75 |
| Update Driver Download Event | UpdateEvent_Success | 30 |
| | UpdateEvent_Failure | 90 |
| | UpdateEvent_UserDeclined | 90 |
| Update Driver Installation Event | UpdateEvent_Success | 20 |
| | UpdateEvent_SuccessOnReboot | 20 |
| | UpdateEvent_Failure | 100 |
| | UpdateEvent_Terminated | 100 |
| | UpdateEvent_Canceled | 75 |

Figure 6:
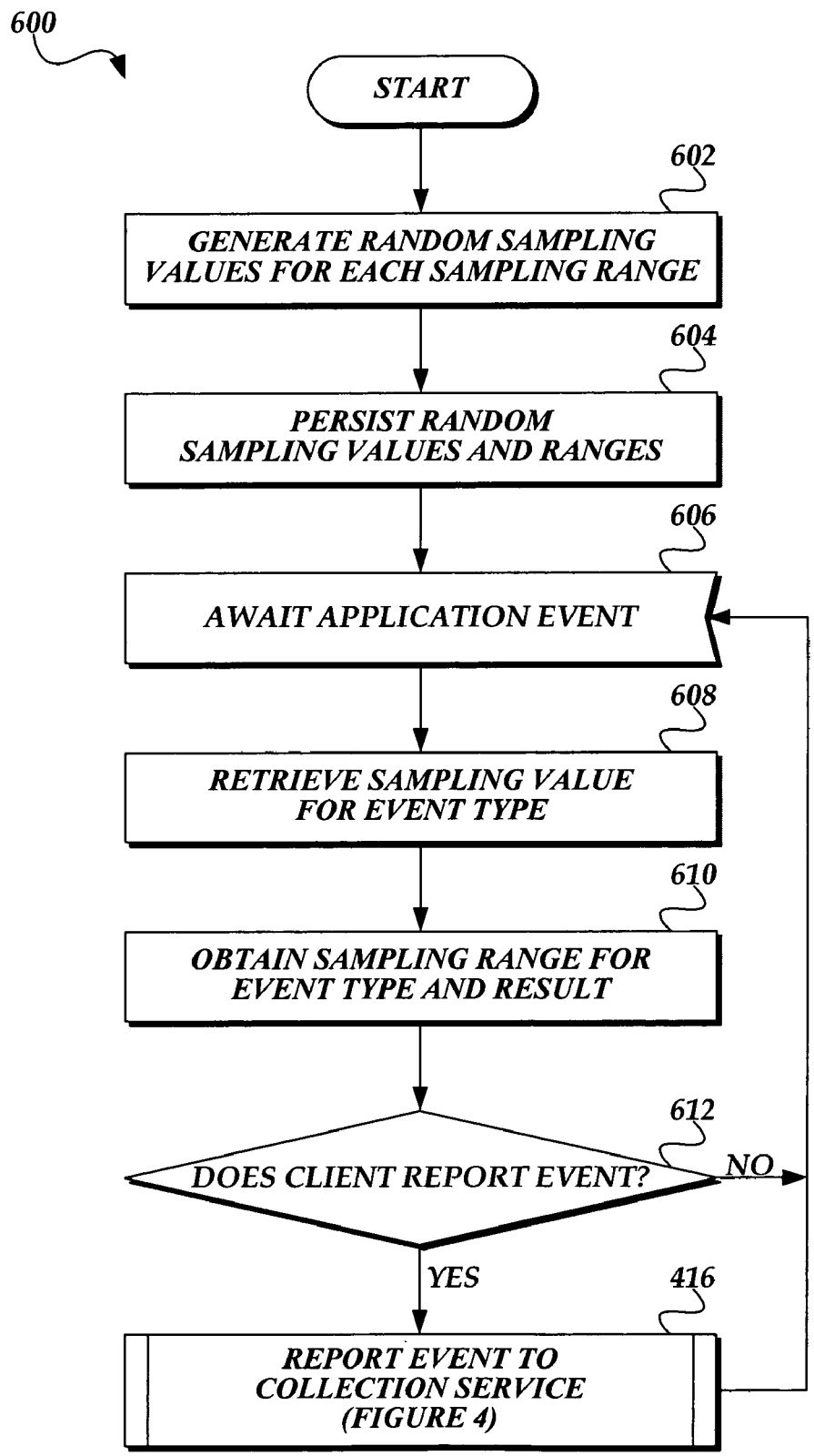
FIG. 6 is a flow diagram illustrating an exemplary routine 500, implementable on a client computer, for determining whether an update event will be transmitted to a collection service 202 according to a plurality of predetermined sampling values/ranges.

FIG. 6 is a flow diagram illustrating an exemplary routine 500, implementable on a client computer, for determining whether an update event will be transmitted to a collection service 202 according to a plurality of predetermined sampling values/ranges, such as those illustrated above in Table A. Beginning at block 602, a random sampling value is generated for each sampling range indicated by the software provider. At block 604, the generated sampling values, along with the sampling ranges, are stored in a persistent storage, such as the computer system registry.

At waiting block 606, the exemplary routine 600 waits for an application update event to occur. Upon the occurrence of an update event, at block 608, the exemplary routine 600 retrieves the sampling value associated with the event type and/or success status. At block 610, the sampling range associated with this particular event type and/or success value is also retrieved. At decision block 612, a determination is made as to whether the sampling value falls within the sampling range, i.e., whether the client computer is to report this update event to the collection service 202. If the client computer is to report the update event to the collection service 202, at block 614, the update event is reported to the collection service.

After reporting the update event to the collection service 202, as described above in regard to FIG. 4, or if the sampling value does not fall within the sampling range, meaning that the client computer is not to report this update event to the collection service, the routine 600 returns to waiting block 606 to wait for the occurrence of additional update events.

As those skilled in the art will appreciate, a software provider's needs in regard to sample sizes may change over time. Thus, according to aspects of the present invention, the client computer periodically checks for and, if necessary, obtains new sampling ranges for use in determining whether to report a specific update event. When checking for new sampling ranges, the client computer may be configured to provide a description of computer, the current sampling values, as well as other pertinent data that may be used in determining the sampling ranges for the client computer. Of course, it is often desirable for a software provider to validate the random distribution of the sample values generated by the client computers. One of the primary reasons is to ensure the integrity of the statistical foundation of a sample, and take corrective action if necessary.

Yet another aspect of the present invention is that quite often an update event is repeated/duplicated. For example, if a software update fails to install a first time, the conditions that caused the first failure may be present when an attempt to install the same software update is made a second time. Thus, a second update event with a status of failure may be sent to the collection service 202. However, it may be undesirable to send duplicate update events or, it may be desirable to flag duplicate events as duplicates. Alternatively, if a client computer does not initially fall within the reported sample for the first failure, a software provider may want to know of all second attempts that also failed. Accordingly, a record of certain update events, such as update events with a failure status, are stored locally on the client computer, and may be used to determine whether to report a specific update event to the collection service 202.

According to an alternative embodiment, sampling rates in the form of dynamic heuristics are obtained from the software provider and stored on the client computer, but the client does not generate random sample values. Instead, for each update event, and in particular in determining whether the client computer should report the update event, the client computer evaluates the content and data of the update event against the applicable sample rate heuristics. Depending on the outcome of the evaluation, the client computer either reports the update event or not. For example, the sample rate heuristics may include the client maintaining a historical distribution of event types and statues, and rules indicating that if the content of the update event falls outside of a standard deviation from mean on a distribution curve, the update event is to be reported. Of course, any number of rules and heuristics provided by the software provider may be used on the client computer to determine whether to report an update event or not.

While various embodiments, including the preferred embodiment of the invention, have been illustrated and described, it will be appreciated that various changes can be made therein without departing from the spirit and scope of the invention.

The embodiments of the invention in which an exclusive property or privilege is claimed are defined as follows:

1. A networked computing system for reporting software events occurring on a client computer to a collection service, the networked computing system comprising:
a collection service communicatively coupled to a communications network and configured to receive software events from a client computer over the communications network; and
a plurality of client computers, wherein each client computer is communicatively coupled to the communications network and further configured to:
generate a random sampling value on the client computer for a corresponding software module, the random sampling value corresponding to a specific type of software event;
receive a predetermined sampling range corresponding to the specific type of software event;
store the generated random sampling value and the predetermined sampling range on the client computer in a persistent storage area;
detect the occurrence of a plurality of software events corresponding to the software module, the plurality of software events being of the specific type; and
upon the occurrence of each of the plurality of software events corresponding to the software module on the client computer:
determine whether the random sampling value falls within the predetermined sampling range; and
report the software event to the collection service over the communications network if the random sampling value falls within the predetermined sampling range.

2. The networked computing system of claim 1, wherein the persistent storage area is the client computer's system registry.

3. The networked computing system of claim 1, wherein each client computer is further configured to generate a plurality of random sampling values for the corresponding software module such that each of the plurality of random sampling values is generated for a corresponding software event type.

4. The networked computing system of claim 1, wherein each client computer is further configured to generate a plurality of random sampling values for the corresponding software module such that each of the plurality of random sampling values is generated for a corresponding pair of software event type and event status.

5. The networked computing system of claim 1, wherein each client computer is further configured to generate a plurality of random sampling values for the corresponding software module such that each of the plurality of random sampling values is generated for a corresponding software event status.

6. The networked computing system of claim 5, wherein each client computer is further configured to determine whether the software event status indicates a failure, and if so, report the software event to the collection service.

7. The networked computing system of claim 1, wherein each client computer is further configured to report the software event to the collection service over the communications network if the random sampling value falls within the predetermined sampling range by:
determining a time at which the client computer is to report software events to the collection service;
caching the software event in an event batch; and
transmitting all software events in the event batch to the collection service at the determined time.

8. A computer-readable storage medium bearing computer-executable instructions which, when executed on a client computer, carry out a method for reporting software events to a collection service, the method comprising:
generating a random sampling value for a corresponding software module, the random sampling value corresponding to a specific type of software event;
receiving a predetermined sampling range corresponding to the specific type of software event;
storing the generated random sampling value and the predetermined sampling range on the client computer in a persistent storage area;
detecting a plurality of reportable software events on the client computer, the plurality of reportable software events being of the specific type;
upon the occurrence of each of the plurality of reportable software events corresponding to the software module:
determining whether the random sampling value falls within a predetermined sampling range; and
reporting the reportable software event to the collection service if the random sampling value falls within the predetermined sampling range.

9. The computer-readable storage medium of claim 8, wherein the predetermined sampling range comprises a predetermined range value and zero.

10. The computer-readable storage medium of claim 8, the method further comprising generating a plurality of corresponding random sampling values, wherein each of the corresponding random sampling values corresponds to a reportable software event type.

11. The computer-readable storage medium of claim 10, wherein each of the corresponding random sampling values corresponds to a pair of a reportable software event type and an event status.

12. The computer-readable storage medium of claim 8, the method further comprising generating a plurality of corresponding random sampling values, wherein each of the corresponding random sampling values corresponds to an event status.

13. The computer-readable storage medium of claim 8, wherein reporting the software event to the collection service if the software event should be reported according to the random sampling value comprises:
  determining a time at which the client computer is to report the reportable software event to the collection service;
  caching the reportable software event in an event batch; and
  initializing a reporting process that will begin transmitting all reportable software events cached in the event batch to the collection service at the determined time.

14. A method for reporting software events on a client computer to a collection service, the method comprising:
  generating a random sampling value corresponding to a software module, the random sampling value corresponding to a type and status of a reportable software event;
  obtaining a predetermined sampling range corresponding to the type and status of the reportable software event;
  storing the sampling value and the predetermined sampling range in a persistent storage on the client computer
  monitoring for the occurrence of a reportable software event of the type and status specified by the random sampling value and the predetermined sampling range; and
  for each reportable software event of the type and status detected on the client computer:
    determining whether the reportable software event should be reported to the collection service by determining whether the generated random sampling value falls within the predetermined sampling range; and
    reporting the reportable software event to the collection service if the random sampling value falls within the predetermined sampling range.

15. The method of claim 14 further comprising:
  generating a plurality of corresponding random sampling values corresponding to a software module and storing the plurality of corresponding random sampling values in the persistent storage on the client computer, wherein each of the plurality of corresponding random sampling values corresponds to a pair of a reportable software event type and an event status; and
  wherein determining whether the reportable software event should be reported to the collection service comprises determining whether the generated random sampling value falls within the predetermined sampling range corresponding to the reportable software event's event type and event status.

16. The method of claim 14, wherein reporting the software event to the collection further comprises:
  determining a time at which the client computer is to report the reportable software event to the collection service;
  caching the reportable software event in an event batch; and
  initializing a reporting process that will begin transmitting all reportable software events cached in the event batch to the collection service at the determined time.

* * * * *